Jan. 16, 1962    W. BENZ ETAL    3,016,886
DUAL FUEL ENGINES
Filed Sept. 1, 1960

United States Patent Office 3,016,886
Patented Jan. 16, 1962

3,016,886
DUAL FUEL ENGINES
Walter Benz, Mannheim-Friedrichsfeld, and Hans Linnenkohl, Mannheim, Germany, assignors to Motoren-Werke Mannheim A.G., vorm. Benz Abt. stat. Motorenbau, Mannheim, Germany, a German company
Filed Sept. 1, 1960, Ser. No. 53,489
9 Claims. (Cl. 123—27)

The invention relates to a governor mechanism for a dual fuel engine in which a switch over can take place from gas operation with pilot oil injection (dual fuel operation) to pure diesel operation or to dual fuel operation with an oil injection amount lying above the pilot oil quantity, the engine always using the highest possible amount of gas that is available. This switch over is carried out automatically upon failure of the gas supply in dependence upon gas conditions and without interference by the speed governor. An adjusting possibility dependent on the gas pressure is provided thereby in the governor linkage which is actuated by the speed governor and connected with the control rack of the oil injection pump of the engine and with a device for metering the gas. Furthermore the gas pressure before the gas metering device controlled by the speed governor will be held by an automatic gas pressure regulator at a pressure lying somewhat above the pressure in the air intake manifold of the dual fuel engine.

It is an object of the invention to improve the forementioned governor mechanism in respect of a true representation of the gas conditions, so that the governing of the engine will be influenced by the gas weight admitted actually per stroke into the working cylinders of the engine.

This object is achieved according to the invention with a governor mechanism of the type described above by the fact that a device responsive to the difference between the gas pressure before the gas metering device and the pressure in the air intake manifold of the engine is connected with the linkage actuating the gas metering device and the control rack of the oil injection pump.

This arrangement has the effect, that pressure variations in the supply pipe leading to the gas pressure regulator, being above the gas pressure delivered by the gas pressure regulator, have no influence on the governor mechanism. Furthermore variations of the gas pressure and of the pressure in the air intake manifold due to speed variations of the engine also have no influence on the governor mechanism, since these pressure variations are compensated at once by the gas pressure regulator, whereby the pressure difference used as an impulse means for the governor mechanism remains constant. However, if the gas supply fails completely or if the gas pressure before the gas pressure regulator drops below the rated value necessary under the existing load conditions of the engine, the pressure difference must drop below the rated value in spite of the fact that the gas pressure regulator opens completely if this happens. If the gas supply fails completely the pressure in the air intake manifold will be released over the gas inlet valve connected with the inlet valve of the engine, which is opened at every intake stroke during the operation of the engine, and over the gas pressure regulator now entirely open, into the gas pipe, which is connected with the pressure responsive device. In other words, the pressure difference serving as an impulse means for the governor mechanism disappears entirely. When this happens the load is carried by means of pure diesel operation. The conversion from gas operation to diesel operation and vice versa takes place in the described manner without interference by the speed governor, provided that the calorific value of the gas does not change, which is normally the case, and that the speed variations between no load to full load operation represent only a few percent of the rated speed.

Another object of the invention is to improve the starting of a dual fuel engine which takes place automatically by means of diesel operation, in some cases by remote control, in order that the switch over to dual fuel operation is carried out only when it is ensured that this conversion can proceed without trouble.

This object is achieved by the fact that a shutting-off device is arranged in the gas supply pipe, which is closed when the engine is shut off and started up and which is opened during normal operation of the engine.

This arrangement has the effect that the gas supply pipe is blocked automatically upon shutdown of the engine and opened after the starting of the engine by means of diesel operation, when the control lever is shifted into the position "operation" whereupon the conversion into dual fuel operation proceeds automatically in the described way.

Another object of the invention is to provide a replacement for lack of gas by an amount of diesel oil, which can give an equivalent working effect in the engine.

This object is achieved by the fact that the variation of the free cross section of the gas metering device depends on the travel of said device in such a way, that a linear ratio exists between the amount of travel of the linkage and the mass flow of gas at a given difference between the pressures before and after the metering device. Otherwise the speed governor has to interfere, which is detrimental in generator drive applications.

Another object of the invention is to avoid any disturbing influences on the governor mechanism in the range of pure diesel operation.

This object is achieved by the fact that the gas metering device is adapted to provide a travel in the direction of greater opening which causes no further variation of the throughflow cross section of the gas metering device.

Another object of the invention is to provide a correction of the adjustment of the governor mechanism dependent on the gas pressure difference by means of a calorimeter fueled by the gas used in the engine, if variations of the calorific value of the gas are to be encountered.

Another object of the invention is to ensure a shock-free conversion from diesel to dual fuel operation.

This object is achieved by the provision that the adjustment of the governor mechanism responsive to the gas pressure difference is delayed in the direction of a conversion from diesel operation to dual fuel operation, whereas the adjustment in the opposite sense takes place without delay. By this arrangement misfires are avoided, which can under certain circumstances occur due to an initial inadequate filling of the gas conveying pipe in the beginning of the gas supply.

In the drawing an embodiment of the invention is schematically disclosed.

Figures 1, 2, 3:
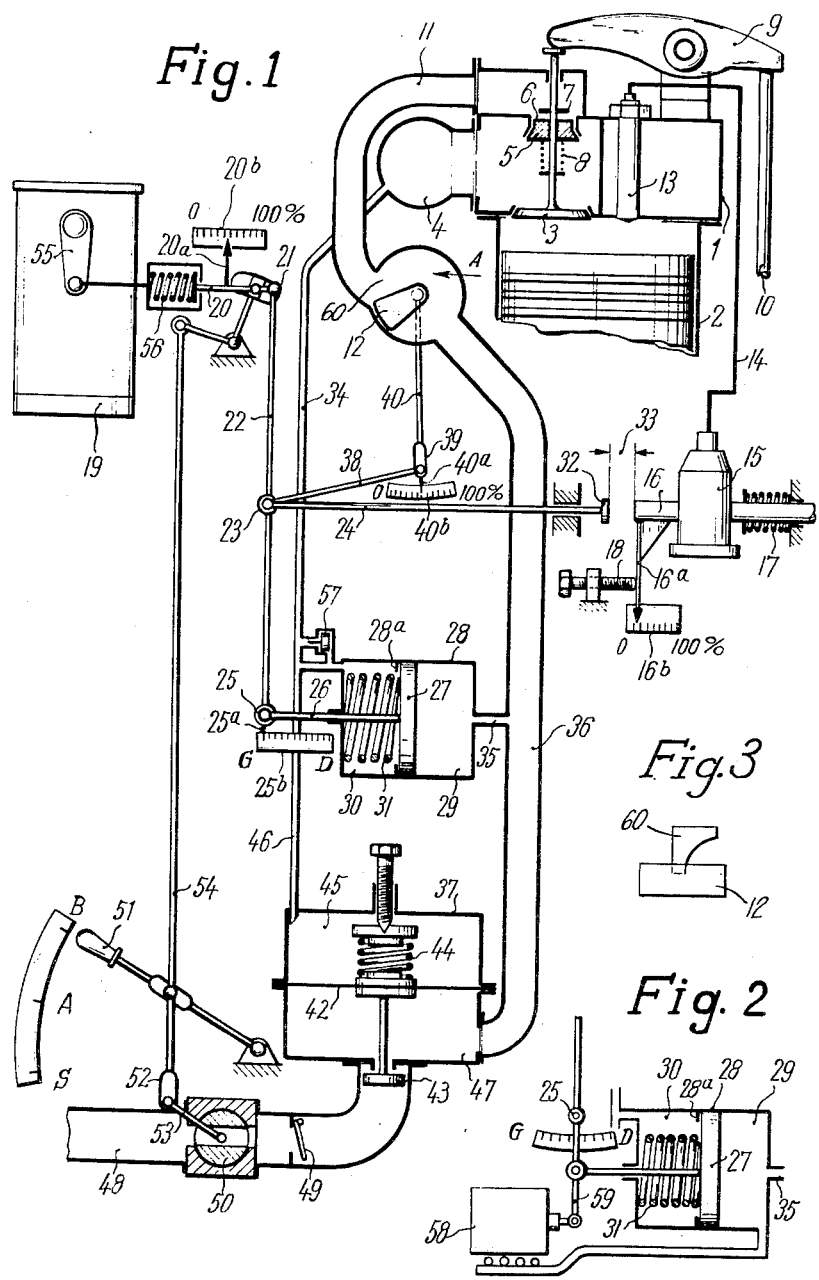
FIG. 1 shows the whole governor mechanism.
FIG. 2 shows an additional correcting device responsive to the calorific value of the gas.
FIG. 3 shows diagrammatically a view in the direction of the arrow A of a modification that can be made to the gas metering device.

A cylinder of a dual fuel engine, on which a cylinder head 1 is mounted bears the designation 2 in FIG. 1. An inlet valve 3 is disposed in the cylinder head 1 and is connected with an air intake manifold 4. A gas inlet valve 5 is fitted loosely on the stem of the inlet valve 3 and has a throttling collar 6, which opens the gas inlet only after the inlet valve 3 has travelled a certain distance. The gas inlet valve 5 is connected with the stem of the inlet valve 3 by means of a follower 7 and a spring 8 in order to obtain a tight fit of the gas inlet valve on its seat after closure of the inlet valve 3. The valves 3 and 5 are actuated in the usual way by means of rocker arms 9 and push rods 10, whereby in case of supercharged engines provision is made, that the gas valve 5 is closed during the scavenging period when both the inlet valve 3 and the exhaust valve (not shown) are open. A gas pipe 11 is connected with the gas inlet valve 5 and contains a gas metering device 12, which is a rotary slide valve in the present embodiment. Also an injection nozzle 13 is inserted into the cylinder head 1. The nozzle 13 is connected with an injection pump 15 by means of a line 14. The injection pump 15 is in the present embodiment a special type with two pistons, the smaller one of which supplying the pilot oil quantity, the larger one supplies the full injection amount. Instead of this pump a pilot oil pump and a separate main injection pump can be used as an alternative with the control racks connected in a suitable way. A control rack 16 of the injection pump 15 is forced by a spring 17 against an adjustable pilot oil stop 18. The injection pump 15 is driven in the usual way by the camshaft (not shown) of the engine. There are as many gas metering devices 12 and injection pumps 15 as there are engine cylinders 2. Also a speed governor 19 driven by the engine is provided. The speed governor 19 is a centrifugal governor with a hydraulically operated power piston. It is possible to use any other speed governor in this case, provided that this governor has enough terminal power for actuating the gas metering devices safely. A governor rod 20 of the speed governor 19 is pivotally linked on its end point 21 on a two-armed lever 22, one fulcrum 23 of which is pivotally connected with a control rod 24 and another fulcrum 25 of which is pivotally connected with a terminal rod 26. A pressure responsive device in the form of a piston 27 is fastened on the terminal rod 26 and travels with a tight fit in a housing 28. In a chamber 29 on one side of the piston 27 acts the pressure existing before the gas metering device 12. In a chamber 30 on the other side of the piston 27 acts the pressure existing in the air intake manifold 4 as well as the force of a spring 31. The control rod 24 ends in an abutment in the form of a tappet 32, which remains during dual fuel operation at a distance 33 from the control rack 16 of the injection pump 15. The chamber 30 is connected with the air intake manifold 4 by means of a line 34. The chamber 29 is connected with a pipe 36 by means of a line 35. The pipe 36 leads from a gas pressure regulator 37 to the gas metering device 12. The fulcrum 23 or another appropriate point of the control rod 24 is connected by means of a link 38 with a coulisse 39 of a lever 40. The lever 40 actuates the gas metering device 12. The coulisse 39 is designed in such a way, that the gas metering device 12 is closed when the fulcrum 23 is in its far left position. By shifting a fulcrum 41 in the coulisse 39 different ratios can be obtained between the travel of fulcrum 23 to the right and the respective opening values of the gas metering device 12. The gas metering device 12 has the form of a hollow cylinder, in the wall of which an opening is provided, the form of which is shaped in such a way that the area of the actually free opening corresponds to the travel of the control rod 24 in such a way, that a linear ratio exists between the travel of the rod 24 and the gas quantity flowing through the metering device at a given pressure difference. A pointer 20a is indicated on the drawing only for clarity purposes on the governor rod 20, which pointer travels on a scale 20b. The engine is shut down when the pointer 20a is in the zero torque position. The engine works under full load when the pointer 20a is in the 100 percent torque position. A pointer 25a is associated with the fulcrum 25, which pointer travels on a scale 25b. The engine works as a dual fuel engine when the pointer 25a is in position G. The engine works as a pure diesel engine when the pointer 25a is in position D. A pointer 40a is indicated on the lever 40, the pointer 40a moving over a scale 40b. The position of the pointer 40a indicates the area of the opening of the gas metering device 12. The scale 40b has a place for the idle travel of the gas metering device 12, which surpasses the position 100 percent=fully open. Within the idle travel no enlargement of the throughflow opening occurs. The shifting of the fulcrum 41 within the coulisse 39 can also be used for equalizing any difference in the supply of gas to the individual cylinders. A pointer 16a is indicated on the control rack 16 which pointer travels on a scale 16b. The part of the scale 40b which corresponds to a varying opening of the gas metering device 12 corresponds in its length approximately to the length of the scale 16b. The traveling distances of the corresponding points of the governor linkage correspond to the lengths of the respective scales. In connection with the forementioned data it is presupposed that the fulcrum 23 is located in the middle of the lever 22. The distance 33 corresponds to the travel of the control rack 16 between pilot oil quantity and full injection amount, when the engine is shut down and when the pointer 25a is in position G. The tappet 32 touches just the control rack 16 when the pointer 25a is in position D. The gas pressure regulator 37 has a diaphragm 42 one side of which communicates with a valve 43. On the other side of the diaphragm acts a spring 44. A chamber 45 in which the spring 44 is disposed is connected with the air intake manifold 4 by means of lines 34 and 46. A chamber 47 on said one side of the diaphragm 42 is connected with the gas inlet pipe 36. The valve 43 feeds the gas pipe 36 from a gas supply pipe 48 and adjusts the pressure in the chamber 47 and in the pipe 36 in such a way that this pressure lies for instance by $\frac{1}{10}$ to $\frac{2}{10}$ atmospheres above the pressure in the intake manifold depending on the tension of the spring 44. The spring 31 must be adjusted for the same pressure difference as the spring 44. The line 34 is connected with the air intake manifold 4 at a point which lies, if a valve for the control of the intake air quantity is provided in the intake air manifold, after this point in the direction of the air flow. The gas pressure regulator 37 can be of different design, provided that it is able to maintain the gas pressure dependent on a pilot pressure at a value a certain pressure difference higher than the pilot pressure. A non return valve 49 is installed in the pipe 48, which prevents air from entering the gas pipe 36 upon failure of the gas suply. Furthermore a cock 50 is installed in the pipe 48, which is connected with the operating lever of the engine in such a way, that the cock 50 is closed when the engine is shut down or started and that the cock is open during normal operation. This is achieved by the fact that a hand lever 51 which can be moved into the positions, B=Normal operation, A=Starting, and S=Shutdown, is coupled with a lever 53 controlling the cock 50 by means of a coulisse 52, so that the lever 53 travels only with the hand lever 51 between the positions A and B. The hand lever 51 is connected with a shutdown linkage 54 which forces the governor rod 20 into the position zero torque when shutting down the engine. Between a lever 55 of the speed governor 19 and the governor rod 20 a spring 56 is interposed, which has such a tension, that it acts substantially as a rigid link with respect to the resistance, which is offered to motion by the gas metering devices 12 and injection pumps 15. The piston 27 is dimensioned in such a way, that it moves only slightly under the influence of the resistance against motion of the above mentioned control means in comparison with the force of the spring 31 and under the influence of the air and gas cushions formed in the chambers 29 and 30. The fulcrum 25 can be made fixed by using a power actuator not disclosed for the adjustment of the fulcrum 25 which is controlled by the pressure difference acting on the piston 27.

In FIG. 2 a correcting device is shown which is controlled by a calorimeter 58. Such a calorimeter consists of a calibrated heating burner, the varying heat release of which is transformed in a travel of a lever by means of a suitable measuring device. This travel corrects by means of a lever 59 the displacement of the fulcrum 25 if the calorific value of the gas per volume unit is not proportional to the variation of the pressure of the gas.

The operation of the governor mechanism described is as follows. It is assumed, that the lever 51 is in position S, that the pipe 48 contains a gaseous fuel of sufficient pressure and that the spring 56 is compressed. The engine is started in the usual way for instance by compressed air upon moving the lever 51 into position A. The pointer 20a will then be moved into position 50 percent by the released spring 56. The pointer 25a is in position D since the pressure in the chamber 29 is no higher than that in the chamber 30 and the spring 31 moves the piston 27 into the right position. The distance 33 has disappeared and the pointer 16a is in position 50 percent. The engine starts up running as a diesel engine with 50% fuel supply. The spring 56 is released completely when the hand lever is moved into position B. It is assumed, that the engine is to give only half output. Under these circumstances the pointer 20a moves back into position 50 percent. The cock 50 is opened by the forementioned actuation of the lever 51, the gas pressure opens the non-return valve 49 and the gas flows through the valve 43 which has been opened by the spring 44 into the chamber 47, in which the pressure is built up and maintained. This pressure is also carried through the lines 35 and 36 into the chamber 29 and moves the piston 27 into the position shown in the drawing, so that it bears upon the abutment 28a. In consequence of this, the pointer 25a moves into position G. The distance 33 reappears. The control rack 16 makes contact with the pilot oil stop 18 under the influence of the spring 17 and the gas metering device 12 is opened halfway. The engine operates now as a dual fuel engine. When the gas supply is insufficient or fails completely, the pointer 25a moves into a position lying between the points G and D or into position D. In consequence of this the gas metering device will be opened to a larger extent. When the complete opening of the gas metering device is not sufficient to allow a gas quantity to pass which is capable of carrying the load imposed on the engine, which is also a function of the pressure difference acting on the piston 27, the oil injection quantity will be adjusted by the governor linkage to surpass the pilot oil quantity in order to make up for the deficiency mentioned until eventually the engine operates as a pure diesel engine upon a complete disappearance of the pressure difference. The governor mechanism described herein before is suitable for supercharged engines as well as naturally aspirated engines if full load and zero load speeds differ only slightly. The pressure difference must be increased with an increase of speed if the engine operates with considerably varying speeds, whereby the biasing of the springs 44 and 31 has to be changed simultaneously and proportionally. A higher pressure difference will be needed in case of a higher speed, in order that the same gas weight enters the engine through the same opening of the gas metering device as in case of low speed, in spite of the inflow time being shorter in the high speed range. The capacity of the pipes 11, 35, 36 and 48 downstream of the non-return valve 49 and the cock 50 should be as small as possible. A dash-pot like device 57 can act on the fulcrum 25, allowing for a displacement of fulcrum 25 in the direction of position G only with delay, but a displacement in the direction of position D without delay. It is also possible to obtain a non linear ratio between the actual free opening of the gas metering device 12 and the travel of the rod 24 in order to allow for a compensation of the variable time which is available for the inflow of a certain gas quantity in case of widely varying speeds. In this case the diminution of the opening cross section will not be proportional to the travel of the rod 24 and to the torque drop, but will change in a sense of lower diminution, since usually the smallest gas quantity per stroke and the smallest torque belongs to the highest speed, the pressure difference being maintained constant. FIG. 3 illustrates the modification just mentioned. The outlet opening 60 to the metering device is shaped in such a way that the aforementioned change of its free cross-section will take place upon travel of the movable member of the device 12.

We claim:

1. In combination with a dual fuel internal combustion engine capable of operating alternatively on a gaseous fuel together with a small substantially fixed amount of liquid pilot fuel or on liquid fuel alone, a speed governor having a governor rod, a first fuel metering device for said gaseous fuel, a second fuel metering device for said liquid fuel surpassing said small amount, a gas pressure responsive device, a gas pressure regulator for said gaseous fuel, a conduit between said gas pressure regulator and said first fuel metering device for receiving gas under pressure from said gas pressure regulator, an air intake manifold of said engine containing air of varying pressure during operation of said engine, said first metering device having a control rod, said second metering device having a control rack, a two armed lever having three fulcrum points, said pressure responsive device comprising a pressure responsive means travelling in a housing, said housing having a first working chamber on a first side of said pressure responsive means and a second working chamber on a second side of said pressure responsive means, said pressure responsive means being operatively connected with a terminal rod, said terminal rod travelling substantially between positions "no gas pressure" and "full gas pressure," a spring in said first working chamber biasing said pressure responsive means into a position causing said terminal rod to be in the "no gas pressure" position, said governor rod travelling substantially between positions "no torque" and "full load torque," said control rod travelling substantially between positions "closed" and "open" of said first metering device, said control rack travelling substantially between positions "pilot fuel" amount and "full injection quantity" of said second metering device, said governor rod, said control rod and said terminal rod being each connected with a different fulcrum point of said two armed lever, an abutment being linked substantially to the same fulcrum point as said control rod, said control rod being substantially in position "open" when said governor rod is in position "full load torque" and when said terminal rod is in position "full gas pressure" said control rack being then in position "pilot fuel" said abutment just touching said control rack, said control rod being substantially in position "open" when said governor rod is in position "full load torque" and when said terminal rod is in position "no gas pressure" said control rack being then in position "full injection quantity" said abutment bearing on said control rack, said control rod being substantially in position "closed" when said governor rod is in position "no torque" and said terminal rod is in position "full gas pressure" said control rack being then in position "pilot fuel" a distance of substantially the same length as the travel of said abutment being between said control rack and said abutment, said governor rod, said terminal rod, said control rod, said abutment and said control rack having intermediate positions depending on the relative positions of said rods, rack and abutment, said first working chamber being connected with said air intake manifold so as to cause the air pressure in said manifold to act on the first side of said pressure responsive means, said conduit being connected to said second working chamber so as to cause said gas pressure in said conduit to be operative on said second side of said pressure responsive means, said gas pressure in said second working chamber being higher than said air pressure in said first working chamber so as to overcome the force of said spring if said terminal rod is in a position other than said "no gas pressure" position.

2. In the combination according to claim 1 a gas supply pipe for supplying gas under pressure to said gas pressure regulator, a cock in said supply pipe and adapted to open and to close said supply pipe, said cock being closed when said dual fuel engine is shut down or starting, and being open when said engine is operating as a dual fuel engine.

3. The combination according to claim 1 wherein the variation of the free cross section of said gas metering device depends on the travel of said device in such a way, that a linear ratio exists between the amount of travel of said control rod and the mass flow of gas through said cross section at a given difference between the gas pressure before and after said device.

4. The combination according to claim 1 wherein said metering device is adapted to provide a further travel of said control rod together with said device in the direction of greater opening in addition to said travel between said positions "closed" and "open" which further travel causes no variation of the throughflow cross section of said metering device.

5. In the combination according to claim 1, a calorimeter, a calorimeter terminal rod, a two armed rocker arm having a central fulcrum and first and second end points, said central fulcrum being pivotally connected with said terminal rod, said first end point being pivotally connected with said fulcrum of said two armed lever travelling between said positions "no gas pressure" and "full gas pressure," said second end point being pivotally connected with said calorimeter terminal rod so as to correct said travel of said two armed lever between said positions "no gas pressure" and "full gas pressure" upon variations of the calorific value of said gaseous fuel.

6. In the combination according to claim 1, a calorimeter, a calorimeter terminal rod, a two armed rocker arm having a central fulcrum and first and second end points, said first end point being pivotally connected with said fulcrum of said two armed lever travelling between positions "no gas pressure" and "full gas pressure," said second end point being connected with said terminal rod, said calorimeter terminal rod being connected with said central fulcrum so as to correct said travel of said two armed lever between said positions "no gas pressure" and "full gas pressure" upon variations of the calorific value of said gaseous fuel.

7. In the combination according to claim 1, a dash pot, said dash pot being adapted to act on said fulcrum of said two armed lever travelling between said positions "no gas pressure" and "full gas pressure," so as to delay said travel from position "full gas pressure" into position "no gas pressure," said travel in opposite direction being undelayed.

8. The combination according to claim 1 wherein the variation of the free cross section of said gas metering device depends on the travel of said device in such a way, that a non linear ratio exists between the amount of travel of said control rod and the mass flow of gas through said cross section at a given difference between the gas pressures before and after said device, the diminution of said cross section upon a travel of said control rod into the direction to position "closed" being lower than proportional of said travel.

9. A governor mechanism for a dual fuel engine adapted to operate on gaseous and liquid fuel, comprising a speed governor having a governor output rod, said rod acting on a gas metering device adapted to meter said gaseous fuel to said engine in response of the load imposed on said engine, a gas inlet valve arranged downstream of said metering device for a supply of said gaseous fuel to said engine when open, a liquid fuel metering device having a control mechanism for varying the amount of said liquid fuel metered to said engine, and being adjusted to feed a fixed amount of liquid fuel to said engine so as to ignite said gaseous fuel, pressure responsive means responsive to the difference of gas pressure in the sense of flow of said gaseous fuel at points before said gas metering device and after said inlet valve, gas pressure regulator means for said gaseous fuel, said regulator means being adapted to maintain constant said pressure difference for an existing supply of said gaseous fuel, said pressure difference dropping upon failure of gas supply, said pressure responsive means being connected to act on said control mechanism upon a drop of said pressure difference so as to increase said amount of said liquid fuel.

References Cited in the file of this patent
UNITED STATES PATENTS
2,686,503    Reddy et al. _____ Aug. 17, 1954